March 24, 1953   F. T. HAGEMANN   2,632,763
SEPARATION PROCESS FOR ACTINIUM
Filed May 25, 1948
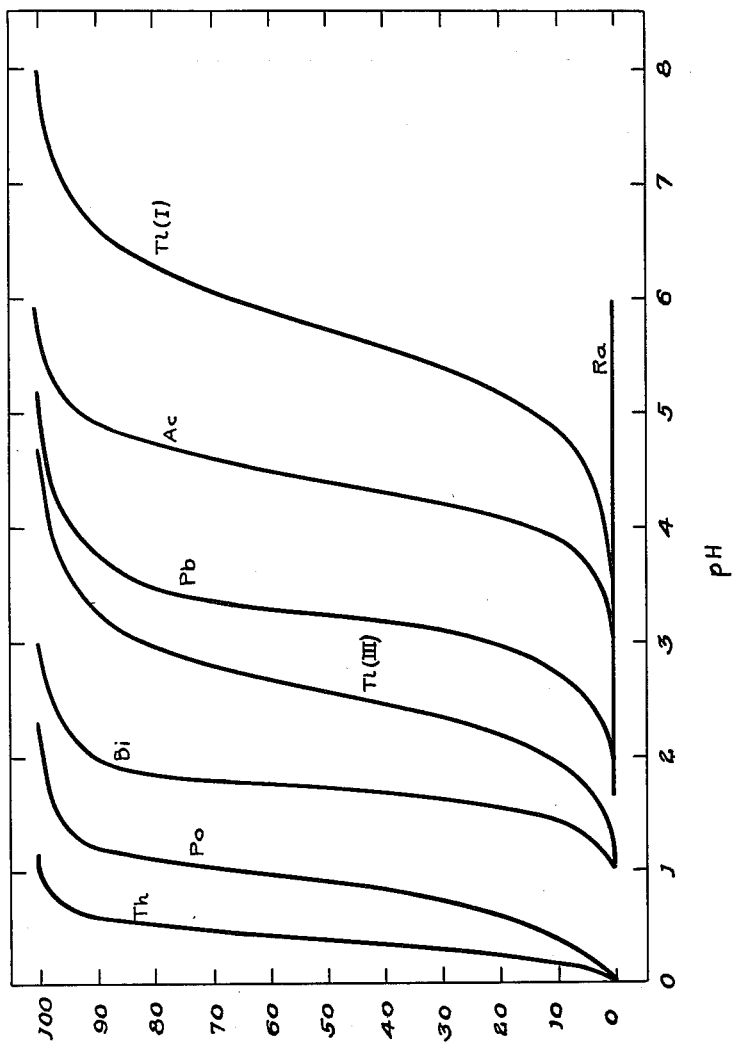
INVENTOR.
French T. Hagemann
BY
Roland A. Anderson
Attorney

UNITED STATES PATENT OFFICE 2,632,763

SEPARATION PROCESS FOR ACTINIUM

French T. Hagemann, Chicago, Ill., assignor to the United States of America as represented by the United States Atomic Energy Commission Application May 25, 1948, Serial No. 29,078

10 Claims. (Cl. 260—332.3)

This invention relates to a process for the separation of actinium from aqueous solutions and more especially relates to the separation of actinium from its mixtures with radium and the daughter elements of radium and actinium. It relates to the separation of thorium from a mixture of thorium and actinium, thereby separating actinium from thorium.

The present invention also relates to the extraction of actinium from an organic solvent solution.

Although actinium was discovered almost fifty years ago it has never been obtained from natural sources in a pure form. Failure to isolate the element has been due to a combination of three unfavorable circumstances: (1) it occurs in only extremely small amounts in uranium ores; (2) its chemical properties are very similar to those of the rare earths, which are also present in much larger amounts in the ores; and (3) its detection and determination are difficult because of the low energy of its beta radiation.

It was recently found that an isotope of actinium could be obtained by the transmutation of radium through the following reactions:

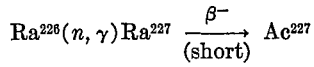

This transmutation has been carried out by neutron irradiation of radium bromide by leaving a tube containing a quantity of radium bromide in a graphite-uranium pile for several months.

It is an object of this invention to separate actinium from aqueous solutions of water-soluble actinium salts.

A second object of the present invention is to separate actinium from a mixture of actinium and radium.

Another object of the present invention is to purify actinium admixed with thorium by separating thorium from an aqueous solution of water-soluble actinium and thorium salts.

Other objects and advantages of this invention will be apparent from the description which follows.

I have found that a suitable separation of actinium from an acidic aqueous solution of a water-soluble actinium salt can be obtained by contacting the aqueous solution with a certain type of chelating agent as an organic solvent solution to form an actinium chelate compound and separating the organic solvent extract phase containing an actinium chelate compound.

The chelating agent of the present invention is a fluorinated β-diketone having the general formula:

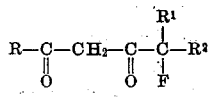

wherein R is a member of the group consisting of alkyl, aryl, aralkyl, alkaryl, and heterocyclic radicals and R¹ and R² are members of the group consisting of hydrogen and fluorine. Of course, the R group may contain various substituents such as halogen groups and nitro groups. It is preferred that R¹ and R² are both fluorine atoms and examples of such a class of compounds are:

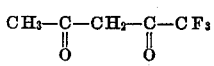

Trifluoroacetylacetone

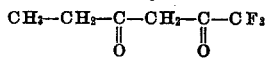

Propionyltrifluoroacetone

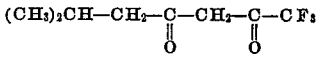

Isovaleryltrifluoroacetone

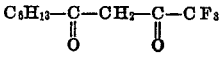

Heptanoyltrifluoroacetone

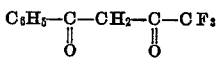

Benzoyltrifluoroacetone

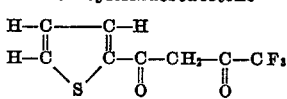

2-thenoyltrifluoroacetone

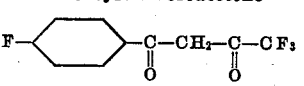

p-Fluorobenzoyltrifluoroacetone

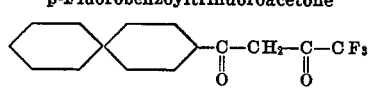

p-Phenylbenzoyltrifluoroacetone

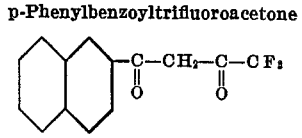

β-Naphthoyltrifluoroacetone

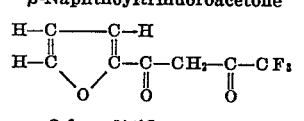

2-furoyltrifluoroacetone

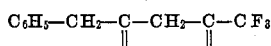

Phenylacetyltrifluoroacetone

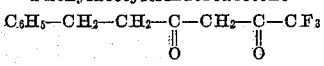

3-phenylpropionyltrifluoroacetone

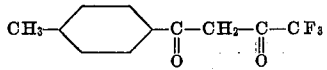

p-Methylbenzoyltrifluoroacetone

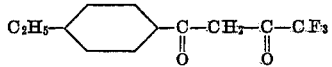

p-Ethylbenzoyltrifluoroacetone

Examples of suitable fluorinated β-diketones containing less than three fluorine atoms are:

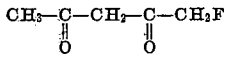

Fluoroacetylacetone

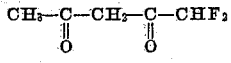

Difluoroacetylacetone

The efficiency of chelation-extraction is not the same for all of these fluorinated β-diketones. It is preferred to use the fluorinated β-diketones containing three fluorine atoms, especially, 2-thenoyltrifluoroacetone and trifluoroacetylacetone.

The organic solvent for the present invention is a non-polar substantially water-immiscible organic compound, which is liquid at the temperature of carrying out the process. Examples of suitable types of organic solvents are aromatic hydrocarbons, chlorinated aromatic hydrocarbons and chlorinated paraffinic hydrocarbons. Specific examples are benzene, toluene, chlorobenzene, hexafluoroxylene, chloroform, carbon tetrachloride, and trichloroethylene. Benzene, toluene, and hexafluoroxylene are the preferred solvents.

To carry out the process of the present invention, the acidic aqueous solution should have a pH of at least 2.5. Any acid may be used to provide this acidity. It is preferred to use an inorganic acid, such as hydrochloric acid and nitric acid. For adequate chelation-extraction of acetinium, the actual minimum pH of the aqueous solution will be determined by the concentration of the chelating agent in the organic solvent solution. When the concentration of the chelating agent in the organic solvent is 1 M or below, it is preferred that the aqueous solution have a pH of at least 4.5. Of course, the process of chelation-extraction can be carried out at a pH of 7 or greater but the alkaline conditions cause hydrolysis of the chelating agent and hydrolysis of the salt of the element to be separated. For these reasons, it is preferred to use acidic aqueous solutions as described above.

The temperature at which the process is carried out may be varied considerably and the preferred temperature is room temperature. The time of contact between the aqueous solution and the organic solvent solution of chelating agent is preferably greater than fifteen minutes.

The concentration of the chelating agent in the organic solvent may be varied widely. As will be seen in the examples below, 0.25 M concentration of the chelating agent, specifically, 2-thenoyltrifluoroacetone, was satisfactory for extracting actinium salts from aqueous solutions having pH values between 4 and 6. The efficiency of extraction is approximately directly proportional to the third power of the chelating agent concentration and inversely proportional to the third power of the hydrogen ion concentration.

The ratio of organic solvent solution to aqueous solution may be varied considerably but the preferred range is between 5:1 and 1:5.

The new compounds of actinium of this invention are chelate compounds of actinium and fluorinated β-diketones and are represented by the general formulas:

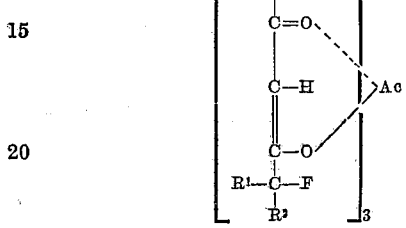

and

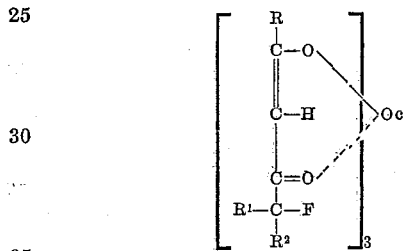

wherein R, $R^1$, and $R^2$ represent the same groups as indicated above for the general formula of the chelating agent. It is seen that there are two possible formulas for the actinium chelate compounds, since the β-diketone may enolize in either of two ways. In either case, actinium is bonded to the oxygen atoms by a covalent bond and a coordinate bond and due to resonance the two compounds would be identical. These compounds are soluble in organic solvents, such as benzene. They are destroyed by concentrated solutions of strong acids.

In one embodiment of this invention actinium is separated from an acidic aqueous solution containing a water-soluble actinium salt and having a pH of at least 2.5 by contacting the aqueous solution with an organic solvent solution of a fluorinated β-diketone of the type described above. The resultant aqueous phase and organic solvent extract phase are separated by settling or centrifugation and the extract phase contains an actinium chelate compound of the fluorinated β-diketone.

The actinium may be separated from the organic solvent solution of actinium chelate compound by contacting the organic solvent solution with an aqueous solution having an acidity greater than a pH of 2 and preferably by contacting with an acidic aqueous solution containing a strong inorganic acid, such as hydrochloric acid and nitric acid, in a concentration at least 0.5 N. The organic solvent phase and the aqueous extract phase containing an actinium salt are then separated.

In another embodiment of the present invention actinium is separated from a mixture of actinium and radium by contacting an acidic aqueous solution of water-soluble salts of radium and actinium and having a pH of at least 2.5 with an organic solvent solution of a fluorinated sodium hydroxide was added to adjust the acidity of the solution to a pH of 6. The solution was extracted with three 35-ml. portions of 0.25 M 2-thenoyltrifluoroacetone in benzene. The combined benzene extract was contacted with 25 ml. of 6 N hydrochloric acid. After separation the acid phase was evaporated to dryness. The residue was dissolved in 25 ml. of 0.1 N hydrochloric acid, pH of 1.0, and contacted with 0.25 M 2-thenoyltrifluoroacetone in benzene to remove thorium isotopes. After removal of the benzene phase sodium hydroxide was added to adjust the pH to 6. Actinium was extracted from the aqueous solution using three 30-ml. portions of 0.25 M 2-thenoyltrifluoroacetone in benzene. The benzene extracts were contacted with 25 ml. of 6 N hydrochloric acid to re-extract actinium. In all of these extractions and re-extractions a contact time of thirty minutes was used. The 6 N hydrochloric acid solution was diluted to 100 ml. with water. One-half ml. of this solution was evaporated on copper electrodes and the residue was found by spectrographic analysis to contain about 42% actinium. The chief impurities were 22% lead, probably RaD, and 22% silicon. Iron, aluminum, calcium and magnesium were the principal constituents of the other 14%. About 0.1% radium was present. Alpha and beta growth curves indicated considerable radioactive impurities were also present.

The actinium chloride solution was evaporated to dryness. The actinium was then purified by two more cycles of chelation-extraction and re-extraction. Each cycle consisted of extraction of thorium isotopes with 0.25 M 2-thenoyltrifluoroacetone in benzene from 0.1 N hydrochloric acid followed by extraction of actinium from the aqueous solution at a pH of 5.5 to 6 and re-extraction of actinium into 6 N hydrochloric acid. After the second cycle the hydrochloric acid solution was evaporated to dryness and the residue was dissolved in 10 ml. of 0.1 N hydrochloric acid. One-half mg. of lead, as a water-soluble salt, per ml. of solution was added. Lead sulfide was precipitated to carry the lead, bismuth and polonium impurities, i. e., to remove these radioactive daughter elements of radium and actinium. The solution was filtered and, when ammonia gas was passed into the filtrate, actinium was precipitated as a white gelatinous mass. The actinium hydroxide was centrifuged and redissolved in 0.1 N hydrochloric acid. Spectrographic analysis showed the product to be greater than 90% actinium. The only impurities present in appreciable amounts were iron, aluminum, calcium, and magnesium. Portions of this material were used to prepare several pure compounds of actinium.

Growth curves of the alpha activity of samples of the purified actinium followed the theoretical curve almost exactly for periods up to four months, indicating that the material is radioactively pure. The yield of pure actinium as calculated from these growth curves was 750 micrograms.

The examples, presented above, of this invention were batch experiments, but the chelation-extraction step and the re-extraction step may be effected by the use of batch, continuous batch, batch countercurrent, or continuous countercurrent methods.

The foregoing illustrations and embodiments of this invention are not intended to limit its scope, which is to be limited entirely by the appended claims.

What is claimed is:
1. A process for the sep: from a mixture of actinium comprises contacting an aci of water-soluble salts of acti having a pH of at least 2.5 nonpolar, substantially wate: solvent of a fluorinated β-( general formula:

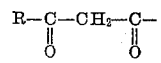

wherein R is a member of t of alkyl, aryl, aralkyl, alka: radicals and R¹ and R² are m consisting of hydrogen and fl ing the resultant aqueous pl radium salt and organic so containing an actinium ch the fluorinated β-diketone.

2. The process of claim 1 w and radium salts are actiniu mides, the pH of the aqueou 4.5, the fluorinated β-diketon roacetone, and the organic s( 3. A process for the sep: from a mixture of actinium comprises contacting an aci of water-soluble salts of ac and having a pH of at least 2 a nonpolar, substantially w ganic solvent of a fluorinate the general formula:

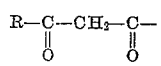

wherein R is a member of the alkyl, aryl, aralkyl, alkaryl a: cals and R¹ and R² are me: consisting of hydrogen and the resultant aqueous phase c um salt and organic solvent taining an actinium chelat( fluorinated β-diketone, cont solvent extract phase with a having an acidity greater tl separating the resultant or{ and aqueous extract phase cor salt.

4. A process for the extr from an organic solvent solu chelate compound of a flu( having the general formula:

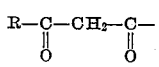

wherein R is a member of t of alkyl, aryl, aralkyl, alkar radicals and R¹ and R² are m consisting of hydrogen and f prises contacting said orga: with an aqueous solution havi er than a pH of 2, and sepa: organic solvent phase and aq containing an actinium salt.

5. The process of claim 4 aqueous solution contains at tration of a strong inorganic 6. The process of claim 5 solvent is benzene, the acti pound is the chelate compou pe described above and sep-
nt aqueous phase containing
organic solvent extract phase
ium chelate compound of the
ne.
ment of the present invention
econd embodiment is carried
, actinium is separated from
t phase by contacting the
ition of the actinium chelate
aqueous solution having an
a pH of 2 and separating the
lvent phase and aqueous ex-
ing an actinium salt. It is
first embodiment, that the
ntains at least 0.5 N concen-
inorganic acid.
bodiment of this invention
d from a mixture of thorium
ontacting an acidic aqueous
a mixture of water-soluble
m salts and having a pH be-
ith an organic solvent solu-
l β-diketone of this invention,
resultant aqueous phase con-
t and the organic solvent ex-
ing a thorium chelate com-
nated β-diketone. The tho-
unds can be represented by
to the actinium chelate comient of the invention is the
um from an organic solvent
ium chelate compound of a
ne of the type disclosed above
rganic solvent solution with
1 having an acidity greater
nd separating the resultant
se and aqueous extract phase
um salt. It is preferred that
ing medium contains at least
of a strong inorganic acid,
ric acid.
parated from the organic sol-
horium chelate compound of
etone of the type disclosed
1 embodiment by contacting
olution with an aqueous solu-
least 1 N concentration of a
d, and separating the result-
phase and aqueous extract
thorium salt.
ts will be apparent from the
invention that follow.
nium, $Ac^{227}$, from neutron-
$Ra^{226}$, involves also the sepa-
rom the long-lived daughter
1 and actinium, i. e., from
bismuth and lead. Although
iters of $Ra^{226}$ and $Ac^{227}$ are
itters, the separation of thal-
olutions by the process of this
ied.
ng water-soluble salts of the
the elements were prepared:
$MsTh_2(Ac^{228})$ for actinium;
iorium; $RaF (Po^{210})$ for polo-
r bismuth; $Tl^{204}$ for thallium;
The salts used were chiefly
couple of nitrates were used.
as thallium perchlorate to
s solution. In each solution
these elements was present.
olution of lead salt the con-
vas 3 mg. of lead per ml. of lead per ml. of solution. The salts of the other elements were used in tracer concentrations, and since the isotopes used were radioactive, either alpha-emitter or beta-emitter, the concentrations were determined by measuring the alpha- or beta-counts per minute for a small aliquot, either 50 or 100 microliters. These aliquots of the original aqueous solutions of tracer amounts of radio-active salts measured several thousand counts per minute. For example, 50 microliters of aqueous solution of the salt of $MsTh_2$ tracer emitted 5225 beta-counts per minute immediately prior to use of the rest of the solution.

To study the extraction of these elements from aqueous solutions by the process of this invention, the aqueous solutions were each equilibrated with an equal volume of 0.25 M 2-thenoyltrifluoroacetone in benzene. The volume of the aqueous solution was either 5, 10, 15, or 40 ml. After separation of the aqueous and benzene phases, the radioactivity of 50 or 100 microliters of the benzene and aqueous phases was determined. The aliquots of the phases, where the aqueous solution contained a lead salt, were analyzed colorimetrically for lead using the dithizone method. The pH of the aqueous solution was measured with a glass electrode. The aqueous phase was changed in pH by the addition of either sodium hydroxide or an acid. Hydrochloric acid was used for lowering the pH of most of the aqueous solutions. Nitric acid was added to the other aqueous solutions to lower the pH. After adjustment of pH the aqueous phase and 0.25 M 2-thenoyltrifluoroacetone in benzene phases were contacted further. After separation aliquots were analyzed and the pH of the aqueous phase was determined as described above. This technique was continued to obtain chelation-extraction data for the various elements at various pH values of the aqueous solutions. These data are presented in the form of extraction curves of a graph in the accompanying drawing which forms a part of this specification.

In the case of the aqueous solution of thallium salt, two series of extraction data were obtained. In the first series thallium was converted to the monovalent state, i. e., Tl(I), by treating the aqueous solution with sulfur dioxide. In the other series thallium was used in the trivalent state, i. e., Tl(III). To insure trivalent thallium, aqua regia was added to the aqueous solution of thallium salt and after evaporation to dryness, the residue was dissolved in 0.1 N nitric acid to obtain the solution used for the extraction study.

The extraction curves of the drawing show that all of the elements, except radium, can be separated from acidic aqueous solutions by the process of this invention provided the pH of the aqueous solution is sufficiently high for the particular element. These curves are extraction data using 0.25 M 2-thenoyltrifluoroacetone and by changing the concentration of chelating agent other extraction curves would be obtained. For example, using higher concentrations of chelating agent in the organic solvent, the curves would be to the left of those in the drawing, i. e., extractions are feasible at lower pH values.

The extraction curves indicates the feasibility of various embodiments of the invention, e. g., separation of actinium from aqueous solution, separation of actinium from a mixture of actinium and radium, and the separation of thorium from a mixture of actinium and thorium.

A 1-g. sample of neutron-irradiated radium bromide was dissolved in 35 ml. of water, and fluoroacetone and the acidic aqueous solution is 6 N hydrochloric acid.

7. A process for the separation of thorium from a mixture of thorium and actinium, which comprises contacting an acidic aqueous solution containing water-soluble salts of thorium and actinium and having a pH between 0.2 and 2.5 with a solution in a nonpolar, substantially water-immiscible organic solvent of a fluorinated β-diketone having the general formula:

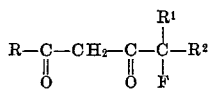

wherein R is a member of the group consisting of alkyl, aryl, aralkyl, alkaryl and heterocyclic radicals and $R^1$ and $R^2$ are members of the group consisting of hydrogen and fluorine, and separating the resultant aqueous phase containing actinium salt and the organic solvent extract phase containing a thorium chelate compound of the fluorinated β-diketone.

8. The process of claim 7 wherein the fluorinated β-diketone is 2-thenoyltrifluoroacetone and the organic solvent is benzene.

9. A process for the separation of thorium and actinium from a mixture of thorium, actinium and radium, which comprises contacting an acidic aqueous solution containing water-soluble salts of thorium, actinium and radium and having a pH between 0.2 and 2.5 with a solution in a nonpolar, substantially water-immiscible organic solvent of a fluorinated β-diketone having the general formula:

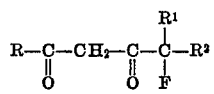

wherein R is a member of the group consisting of alkyl, aryl, aralkyl, alkaryl and heterocyclic radicals and $R^1$ and $R^2$ are members of the group consisting of hydrogen and fluorine, separating the resultant aqueous phase containing actinium and radium salts and the organic solvent extract phase containing a thorium chelate compound of the fluorinated β-diketone, adjusting the pH of the aqueous phase to a value greater than 2.5 and less than 7, contacting the resultant aqueous solution with a solution in a nonpolar, substantially water-immiscible organic solvent of a fluorinated β-diketone having said general formula, and separating the resultant aqueous phase containing radium salt and the organic solvent extract phase containing an actinium chelate compound of the fluorinated β-diketone.

10. The process of claim 9 wherein the fluorinated β-diketone is 2-thenoyltrifluoracetone and the organic solvent is benzene in both contacting steps.

FRENCH T. HAGEMANN.

REFERENCES CITED

The following references are of record in the file of this patent:

UNITED STATES PATENTS

| Number | Name | Date |
|---|---|---|
| 2,227,833 | Hixson et al. | Jan. 7, 1941 |

FOREIGN PATENTS

| Number | Country | Date |
|---|---|---|
| 289,493 | Great Britain | Apr. 30, 1928 |

OTHER REFERENCES

Synthetic Organic Chemicals, vol. VII, No. 5, July 1934. Published by Eastman Kodak Co., Rochester, N. Y.